Oct. 29, 1957
T. M. COLE ET AL
2,811,618
METAL-CLAD SWITCHGEAR
Filed April 20, 1956
2 Sheets-Sheet 1
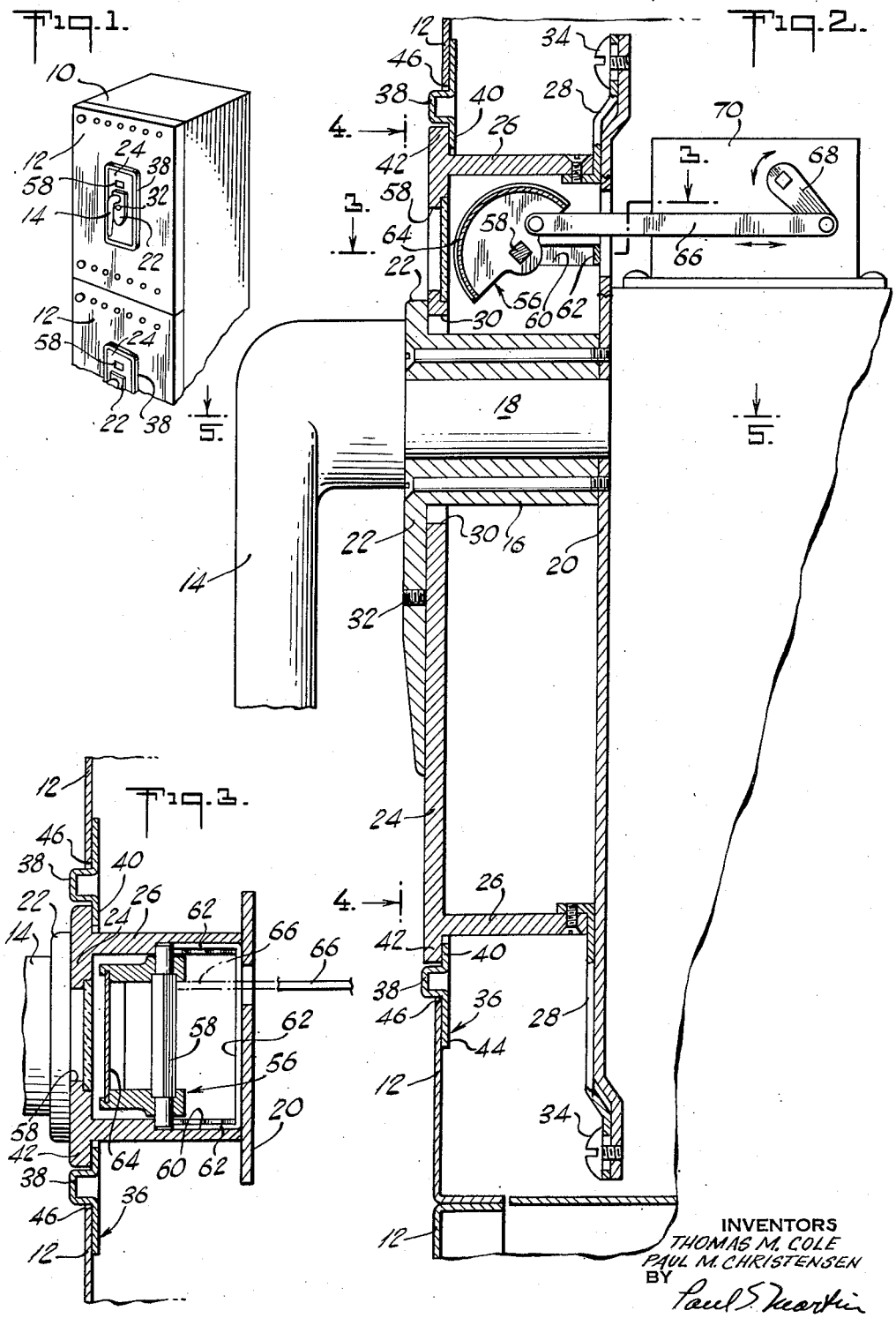
INVENTORS
THOMAS M. COLE
PAUL M. CHRISTENSEN
BY
Paul S. Martin
ATTORNEY

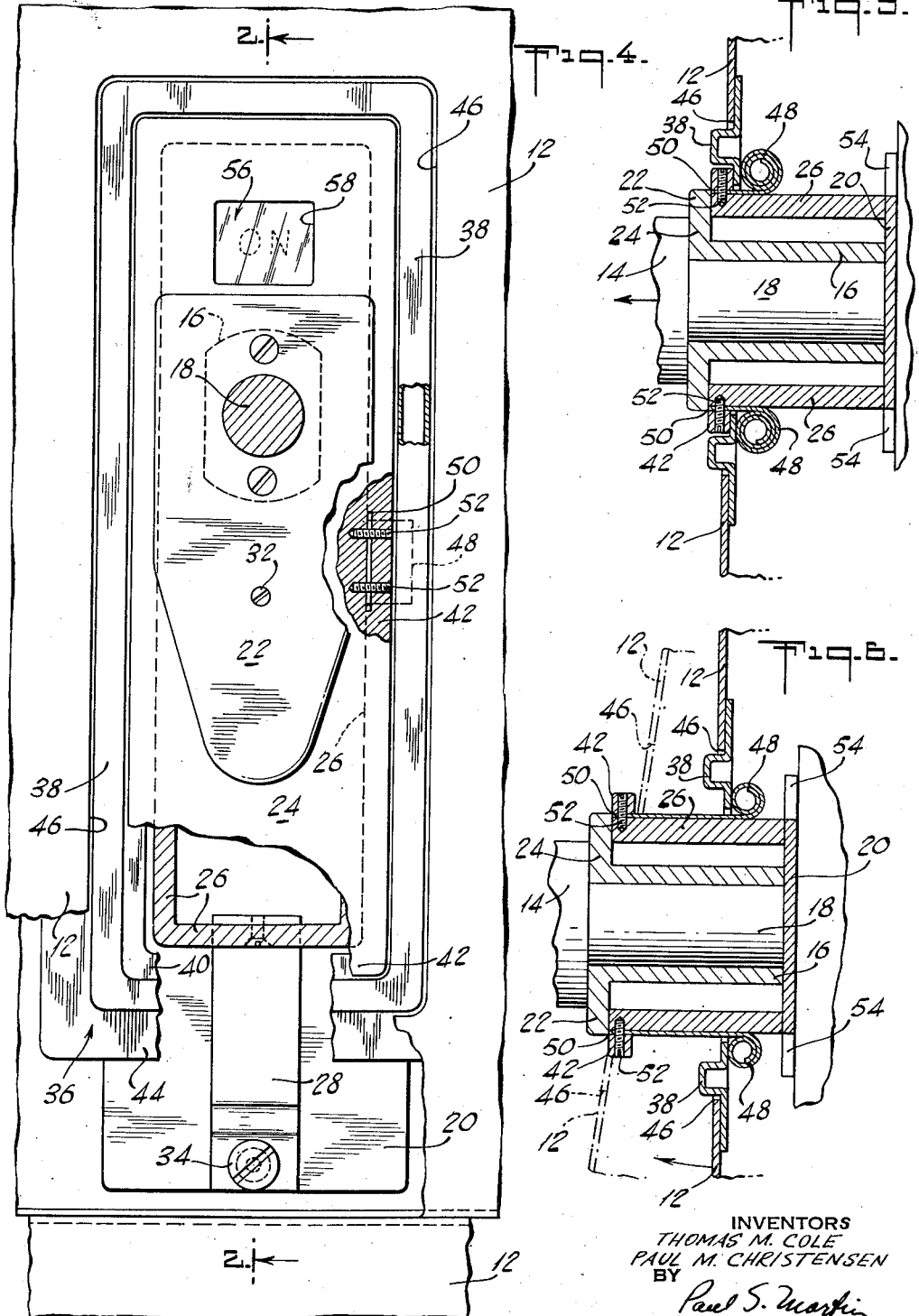

2,811,618

METAL-CLAD SWITCHGEAR

Thomas M. Cole, Harrison, N. Y., and Paul M. Christensen, West Orange, N. J., assignors to Federal Pacific Electric Company, a corporation of Delaware Application April 20, 1956, Serial No. 579,502

14 Claims. (Cl. 200—168)

The present invention relates to metal-clad switchgear and in particular it is concerned with the front protective structure for such switchgear.

A common form of switchgear installation, termed "metal-clad" switchgear, includes a circuit breaker in a metal enclosure having a front panel, with an operating handle extending from the enclosed mechanism through an opening in the panel. The panel is usually a hinged part of the enclosure, within which a circuit breaker is removably received. The enclosure enhances appearance, protects the circuit breaker from dust, etc., and guards against accidental hazardous contact.

Certain aspects of the present invention are concerned particularly with circuit breakers of the draw-out type. When in fully inserted operating position, main sliding bus contacts of the circuit breaker engage a set of bus bars. The circuit breaker may be drawn forward to a "test" position in which the main bus contacts disengage the bus bars, while auxiliary contacts remain in engagement with the bus bars for various functions, including operation of the circuit breaker electrically by means of an electromagnet in the circuit breaker. The circuit breaker has a manually operated mechanism for bodily shifting it fore-and-aft as a unit within the enclosure, to establish the "test" position and to drive the unit all the way back into its operating position. That mechanism is concealed by the panel when closed. The panel is opened when the circuit breaker is to be shifted.

The front panel of the enclosure advantageously should be closed with the circuit breaker in "test" position, just as it is when the circuit breaker is in its normal operating position. An object of the present invention is to provide a novel face-plate assembly for switchgear accommodating both the normal and the partly projected positions of the switchgear with the front panel closed.

The opening in the front panel of the illustrative novel apparatus described in detail below is of adequate size to allow the panel to be opened and closed without removing the handle and without interference between the front panel and the projecting portion of the circuit breaker surrounding the handle, during operation of the panel from open to closed position and the reverse. The lateral space from the operating handle structure to the edge of the door opening should be closed off when the panel is closed in order to complete the enclosure. In the illustrative embodiment of the invention, a floating frame is provided for this purpose. The frame is biased forward so as to be pressed toward the back face of the panel around the edges of the opening and to be pressed toward the back surface of a face-plate associated with the operating handle.

When the circuit breaker is in "test" position, the handle, its bearing and the face-plate all project forward of the panel, and the floating frame is biased against the back face of the panel.

When the circuit breaker is in its normal operating position it would be desirable for the floating frame to engage both the door panel and a back surface of the handle structure. However, due to inevitable assembly tolerances, the frame will engage either one of those back surfaces but not both. An objectionable space may be expected to develop between the frame and the back face of the panel or between the frame and the back face of a portion of the handle structure. A feature of the present invention resides in the provision of a forward projecting rib that obstructs and largely conceals such space, should a space develop either between the frame and the panel or between the frame and the face-plate.

The floating frame is carried by the circuit breaker, as part of the projecting structure associated with the handle. This structure projects forward of the main body of the circuit breaker so that the circuit breaker may remain enclosed even when the unit is bodily shifted forward to "test" position and even though the panel is closed. In this operation the handle and the face-plate structure associated with the handle necessarily extend outward of the panel.

In this connection, a further feature of the invention resides in the provision of means for centering the projecting face-plate structure associated with the handle within the panel opening and a still further feature of the invention, related to the foregoing, is in an arrangement enabling a minimum of space to be provided between the structure that projects through the panel opening and the edge of that opening while at the same time enabling swinging of a hinged front panel, when the circuit breaker is in either the normal position or the projecting test position.

It is important that an indicator be provided in such switchgear to show whether the circuit breaker is "open" or closed. Further features of the invention are concerned with the support of such indicator quite close to a display window in the structure associated with the operating handle, and in the support of the indicator within the structure that shifts when the handle structure is laterally adjusted for centering in the panel opening.

The illustrative apparatus disclosed herein thus involves several novel features, including a face-plate structure about the operating handle which carries both an indicator and an floating frame, a floating frame having a rib that blocks any potential gap resulting from fore-and-aft assembly tolerances; and a handle assembly that accommodates lateral tolerances between the circuit breaker mounting and the panel opening. The nature of the invention and further features of novelty will be more fully appreciated from the following detailed description of the illustrative embodiment which is shown in the accompanying drawings forming a part of this disclosure. In the accompanying drawings:

Fig. 1 is a perspective of a metal-clad enclosed circuit breaker drawn to reduced scale;

Fig. 2 is a fragmentary vertical cross-section of an embodiment of the invention;

Fig. 3 is a fragmentary horizontal cross-section along line 3—3 in Fig. 2;

Fig. 4 is a fragmentary front elevation partly in cross-section of the apparatus in Fig. 2 along the line 4—4;

Fig. 5 is a fragmentary horizontal cross-section of the apparatus along the line 5—5 in Fig. 2; and Fig. 6 is a view similar to Fig. 5 with the enclosed circuit breaker in a partly projected "test" position and with the door of the enclosure shown in an intermediate position in broken lines as well as in fully closed position in full lines.

Referring now to the drawings, there is shown a metal enclosure 10 for a circuit breaker, having a panel or door 12 hinged at its left-hand edge. The panel or door has an opening 46 through which handle 14 of the enclosed circuit breaker projects to a readily accessible position.

In Fig. 2 handle 14 is shown having shaft 18 supported in a bearing 16 that is secured to fixed member 20 of the circuit breaker. Member 16 has a flange 22 that projects peripherally about the bearing portion in all directions, this flange having an outline illustrated in Fig. 4.

An adjustable face-plate member 24 having side walls 26 and mounting brackets 28 is in sliding engagement with the back surface of flange 22. Member 24 has an opening 30 which is larger in all directions than member 16 (disregarding flange 22) so that this face-plate member 24 is easily shifted laterally to a desired position of adjustment. Member 24 slides laterally during adjustment, being confined between the back face of flange 22 and the front of plate 20. Screw 32 fixes the relative adjustment between members 22 and 24 temporarily, by preventing the sliding of member 24, and screws 34 provide permanent adjustable securing means for holding member 24 in its adjusted position. Brackets 28 have large holes through which screws 34 project, and the heads of screws 34 are particularly large, so that member 24 can be adjusted both vertically and horizontally in the plane of member 20 and thereafter held in adjusted position.

A floating frame member 36 embodies a relatively wide rib 38 which neatly surrounds the front face of member 24. Member 36 has a flange 40 (Fig. 2) which underlies a flange 42 extending from member 24. Member 36 also has a peripheral flange 44 that extends outwardly in all directions. Door 12 has an opening 46 which receives rib 38. The shape of this rib is the same as the opening. The rib is somewhat smaller than the opening to allow for door operation but not so much smaller as would be needed to allow for variations accommodated by the provision of the separate adjustable member 24.

Member 36 is biased forward toward door 12 and flange 42, by a pair of coiled leaf springs 48 received in slots 50 in flange 42. Springs 48 are held in position by screws 52 in flange 42, which extend through holes in those leaf springs. The opening in floating frame member 36 defined by the inner edge of flange 40 fits loosely about the side walls 26 of member 24, and the side edges of that opening engage springs 48. When the door is open, member 36 may be pushed backward toward circuit breaker frame member 20. Member 36 can bottom against member 20, notches 52 being provided in member 20 for accommodating the final travel of the coiled portions of springs 48.

It may be assumed that the circuit breaker has been mounted in enclosure 10 and that door 12 is to be closed, for the first time. At such time, screws 34 are deliberately left loose. With screw 32 loose, the door 12 can be closed or very nearly closed against member 36. Member 24 can then be adjusted, carrying member 36 with it, for accurately entering rib 38 in opening 46 of the door. Screw 32 is then tightened for temporarily holding member 24 in position, screw 32 gripping member 24 between flange 22 and circuit breaker member 20. Door 12 is then opened, and screws 34 are tightened to hold members 24 and 36 in adjusted position, accurately centered in opening 46. This feature of adjustment makes possible relatively wide manufacturing tolerances in the orientation of the circuit breaker within the enclosure 10 and its door 12, while at the same time retaining a precise-fitting neat front appearance. The lateral variations in positioning of the circuit breaker within the enclosure are accommodated by provision of the separate, adjustable face-plate member 24. Fore-and-aft variations in relative positioning of door 12 and flange 22, which would produce a gap between frame 36 and either the door or flange 22, are taken into account by provision of rib 38 that extends across any such gap and thus blocks the gap.

After member 24 has once been fixed in adjusted position, repeated opening and closing of the door when required naturally does not disturb the adjusted relationship. The same adjusted relationship prevails when the circuit breaker is shifted bodily forward in enclosure 10, as is customary for establishing a "test" position for the circuit breaker. Door 12 is shown closed against the circuit breaker in "test" position in Fig. 6. The door opening 46 is seen accurately centered about rib 38 of the floating frame 36.

Ordinarily the circuit breaker requires a cam draw-out mechanism for shifting circuit breaker from its fully inserted position of Fig. 5 to the partly projected position of Fig. 6, which mechanism is concealed by door 12. For operating this mechanism the door is opened. Thereafter, when the door is to be closed, member 36 is in its forward position with its flange 40 against flange 42 of member 24. As the door is swung toward closed position, it engages member 36 and causes frame 36 to assume the slant of the door, the opening in frame member 36 being large enough to receive walls 26 in this slant configuration of the member 36. The door pushes member 36 toward member 20, as illustrated in Fig. 6. During the angular closing swing of the door, there is a sliding component of relative motion of the door across the front face of member 36 but this creates no difficulty. There is no trouble in opening the door even in the "test" position of Fig. 6, for there are clearances between rib 38 and door opening 46, and between frame member 36 and walls 26 of member 24. Also, as mentioned above, frame member 36 assumes the slant of the door during swinging of the door thus avoiding binding engagement between the edge of the door opening and the outer surface of the rib 38.

In order that the enclosed circuit breaker may be shifted to a projected test position and at the same time enable the door to be closed, member 16 is formed with the corresponding fore-and-aft dimension to accommodate such shift. Member 24 has a similar fore-and-aft dimension as represented by wall 26. This wall forms the support for an "off"-"on" indicator 56 for the circuit breaker. This indicator is visible through a large opening 58 in member 24, having a transparent window therein. The window may readily be made quite large so that the indicator readily will also display the words "open" and "closed" if desired. Indicator 56 has a shaft 58 whose ends are received in grooves 60 in side walls 26 of member 24. A U-shaped member 62 has the legs received in grooves 60 to prevent shaft 58 from shifting. Member 62 is held in position between member 24 and circuit breaker member 20.

The half-cylinder legend-bearing indicator 65 is connected by link 66 for operation by arm 68 of a switch 70 mounted on the circuit breaker. Handle 14 operates the circuit breaker mechanism to open and close it manually, but indicator 56 is automatically operated to indicate "open" or "closed" so as to show whether the circuit breaker is actually closed or has been tripped open either manually or automatically. Link 66 is of sufficient length to accommodate the range of lateral adjustment of member 24, and because that indicator is mounted within the hollow member 24 it remains in proper position behind window 58.

It is evident that the foregoing illustrative embodiment of the invention and its various features are subject to a latitude of modification and varied application; and accordingly the invention should be broadly construed consistent with its full scope and spirit.

We claim:

1. Draw-out switchgear including an enclosure having a panel formed with an opening, switchgear in said enclosure having an operating handle extending through said opening and having a handle bearing, and a face-plate assembly occupying the lateral space between said handle bearing and said panel opening, including a member having lateral walls substantially perpendicular to said panel and having a flange projecting outwardly of said walls and adjustably centered within said panel opening, and a floating frame behind said flange and behind said panel and spring biased toward the rear surfaces of said panel and said flange when the switchgear is in its fully inserted operating position, said switchgear being adjustably mounted to a "test" position in the enclosure forward of its fully inserted position, and said floating frame cooperating with said panel when the panel is being moved from open position into its normal closed position on the enclosure and when the switchgear is in its test position, for moving the floating frame rearward along said walls and away from said flange.

2. Draw-out switchgear including an enclosure having a panel formed with an opening, switchgear in said enclosure having an operating handle extending through said opening and having a handle bearing, and a face-plate assembly occupying the lateral space between said handle bearing and said panel opening, including a member having lateral walls substantially perpendicular to said panel and having a flange projecting outwardly of said walls and adjustably centered within said panel opening, and a floating frame behind said flange and behind said panel and spring biased toward the rear surfaces of said panel and said flange when the switchgear is in its fully inserted operating position, said switchgear being adjustably mounted to a "test" position in the enclosure forward of its fully inserted position, and said floating frame cooperating with said panel when the panel is being moved from open position into its normal closed position on the enclosure and when the switchgear is in its test position, for movng the floating frame rearward along said walls and away from said flange, said handle bearing having a flange overlying said face-plate and said face-plate assembly being laterally adjustable as a unit relative to said handle bearing.

3. Drawout switchgear including an enclosure having a panel formed with an opening, switchgear in said enclosure having an operating handle extending through said opening and having a handle bearing, and a face-plate assembly occupying the lateral space between said handle bearing and said panel opening, including a member having lateral walls substantially perpendicular to said panel and having a flange projecting outwardly of said walls and adjustably centered within said panel opening, and a floating frame behind said flange and behind said panel and spring biased toward the rear surfaces of said panel and said flange when the switchgear is in its fully inserted operating position, said switchgear being adjustably mounted to a "test" position in the enclosure forward of its fully inserted position, and said floating frame cooperating with said panel when the panel is being moved from open position into its normal closed position on the enclosure and when the switchgear is in its test position, for moving the floating frame rearward along said walls and away from said flange, said frame having a forward projecting rib between said flange and said opening.

4. Metal-clad switchgear, including an enclosure having a front panel formed with an opening, a circuit breaker in said enclosure including a handle assembly projecting through said opening, said handle assembly including a face-plate member about said handle formed with a back surface adapted to be disposed in approximate alignment with the panel and having a support extending through said opening, and a frame member carried by said circuit breaker and biased toward the rear face of the panel and toward the back surface of the face-plate, said frame member having an opening through which the face-plate extends and said frame having a projecting rib extending about the periphery of said face-plate and along the edge of said panel opening.

5. Metal-clad switchgear including an enclosure having a front panel formed with an opening, a circuit breaker in said enclosure including a handle assembly projecting through said opening, said handle assembly including a face-plate member formed with back surface generally parallel to said panel, a frame member biased toward the rear face of the panel and toward said back surface, said frame member having a projecting portion extending forward across the edge of said panel opening all around and close to said panel opening.

6. Metal-clad switchgear including an enclosure having a front panel formed with an opening, a circuit breaker in said enclosure including a handle assembly projecting through said opening, said handle assembly including a face-plate member formed with back surface generally parallel to said panel, a frame member biased toward the rear face of the panel and toward said back surface, said frame member having a projecting portion extending forward across the edge of said panel opening all around and close to said panel opening, said frame member being carried by said face-plate member and said face-plate member having laterally adjustable securing means on said circuit breaker.

7. Metal-clad switchgear including an enclosure having a front panel formed with an opening, a circuit breaker in said enclosure including a handle assembly projecting externally through said opening, said handle assembly including a handle extending through said opening, a face-plate member about said handle formed with a back surface generally parallel to said panel and having a support extending through said opening and adjustably secured to said circuit breaker, a frame member carried by said face-plate member and biased toward the rear face of said panel and toward the back surface of said face-plate, said face-plate being apertured to enable the handle support to extend therethrough, and said handle assembly having a member formed with a generally flat surface extending across said aperture, and said aperture being oversize for accommodating lateral adjustment of said face-plate and said further member covering the aperture in all adjusted positions of the face-plate member, the frame member moving with the face-plate member during such adjustment for proper orientation thereof within said panel opening.

8. Enclosed switchgear including an enclosure having a panel formed with an opening, switchgear in said enclosure having an operating handle forward of said panel and extending through said opening, said handle being surrounded by a face-plate assembly generally flush with said panel when said switchgear is in its normal operating position, said face-plate assembly having an outwardly extending flange, and a spring biased frame against the rear surfaces of said flange and said panel and having a rib projecting outwardly between said flange and said opening.

9. Enclosed switchgear including an enclosure having a panel formed with an opening, switchgear in said enclosure and having an operating handle extending through said opening to an externally accessible position and a face-plate assembly filling said opening, said face-plate assembly including a bearing member for said operating handle affixed to said switchgear and having a flange, a member having a face-plate adjustably affixed about said handle-bearing in face-to-face contact with the rear face of said flange, said member having a wall extending rearward from said face-plate and adjustably affixed to said switchgear and said face-plate having a flange extending outward of said wall, and a floating frame spring biased toward the rear face of said panel and said face-plate flange and having an opening about said wall, said switchgear being movable to a forward "test" position when said panel is removed and said panel cooperating with said floating member when being replaced to shift said floating member along said wall.

10. Enclosed switchgear including an enclosure having a panel formed with an opening, switchgear in said enclosure and having a handle projecting out of said opening to an accessible position forward of said panel, and a face-plate assembly including a handle bearing member formed with a laterally extending flange, and a face-plate member, a window opening outward of said flange of said bearing member, an indicator having a supporting bearing in said face-plate member and disposed for viewing through said window, whereby when the face-plate member is adjusted relative to said flange for laterally centering the face-plate within said panel opening, said indicator will remain fixedly oriented behind said window, said indicator having an operating linkage extending rearward to said switchgear, said face-plate member having a peripheral flange, and a floating frame spring biased toward the rear of said peripheral flange and toward the rear of said panel, said switchgear having a normal fully inserted position wherein said face-plate is substantially flush with said panel and a "test" position in which said face-plate is disposed forward of said panel, said face-plate member having a wall extending rearward of said face-plate and said floating frame having an opening receiving said wall and movable therealong to a position spaced from said peripheral flange when the switchgear is in its projected test position and when said panel is closed.

11. Enclosed switchgear including an enclosure having a door formed with an opening, draw-out switchgear in said enclosure and having a handle projecting through said opening to a conveniently accessible position, said switchgear having a normal, fully inserted operating position and a "test" position in which it is projected forward of its normal operating position, said switchgear having a face-plate assembly generally flush with said panel when the switchgear is in its normal operating position, said face-plate assembly including a member having a laterally projecting flange and a rearward extending wall, a floating frame having an opening receiving said wall and spring biased forward toward the rear face of said panel and toward the rear face of said flange, said frame having a projection extending through the opening of said panel extending all around said panel opening.

12. Switchgear for an enclosure bearing a front panel having an opening for the operating handle of the switchgear, said switchgear including a front operating handle, a face-plate assembly about said handle adapted to occupy the space within said opening about said handle, said face-plate assembly including a laterally adjustable member having a peripheral flange, a frame member about said face-plate member and spring means biasing said frame toward the back of said flange.

13. Switchgear for an enclosure bearing a front panel having an opening for the operating handle of the switchgear, said switchgear including a front operating handle, a face-plate assembly about said handle adapted to occupy the space within said opening about said handle, said face-plate assembly including a laterally adjustable member having a peripheral flange, a frame member about said face-plate member and spring means biasing said flange toward the back of said flange, said frame member having a rib about said flange.

14. Enclosed switchgear, including an enclosure having a front panel formed with an opening, switchgear in the enclosure having an operating shaft projecting through said opening, and an assembly occupying the space between said shaft and said openinging, said assembly including a laterally adjustable face-plate member adapted to be centered in said panel opening and having an aperture through which said shaft extends, said face-plate member further having a window opening, said shaft having associated therewith a flanged member overlying said face-plate member in the area about said aperture but terminating short of said window, and an indicator carried by said face-plate member rearward of said window to be adjustable therewith and said indicator having an operating linkage extending to the portion of the switchgear which adjustably carries the face-plate member.

No references cited.